Feb. 9, 1932.   W. R. TEMPLETON   1,844,450
STEAM TRAP
Filed Dec. 17, 1929    4 Sheets-Sheet 2

Inventor.
William R. Templeton
by Heard Smith & Tennant.
Attys.

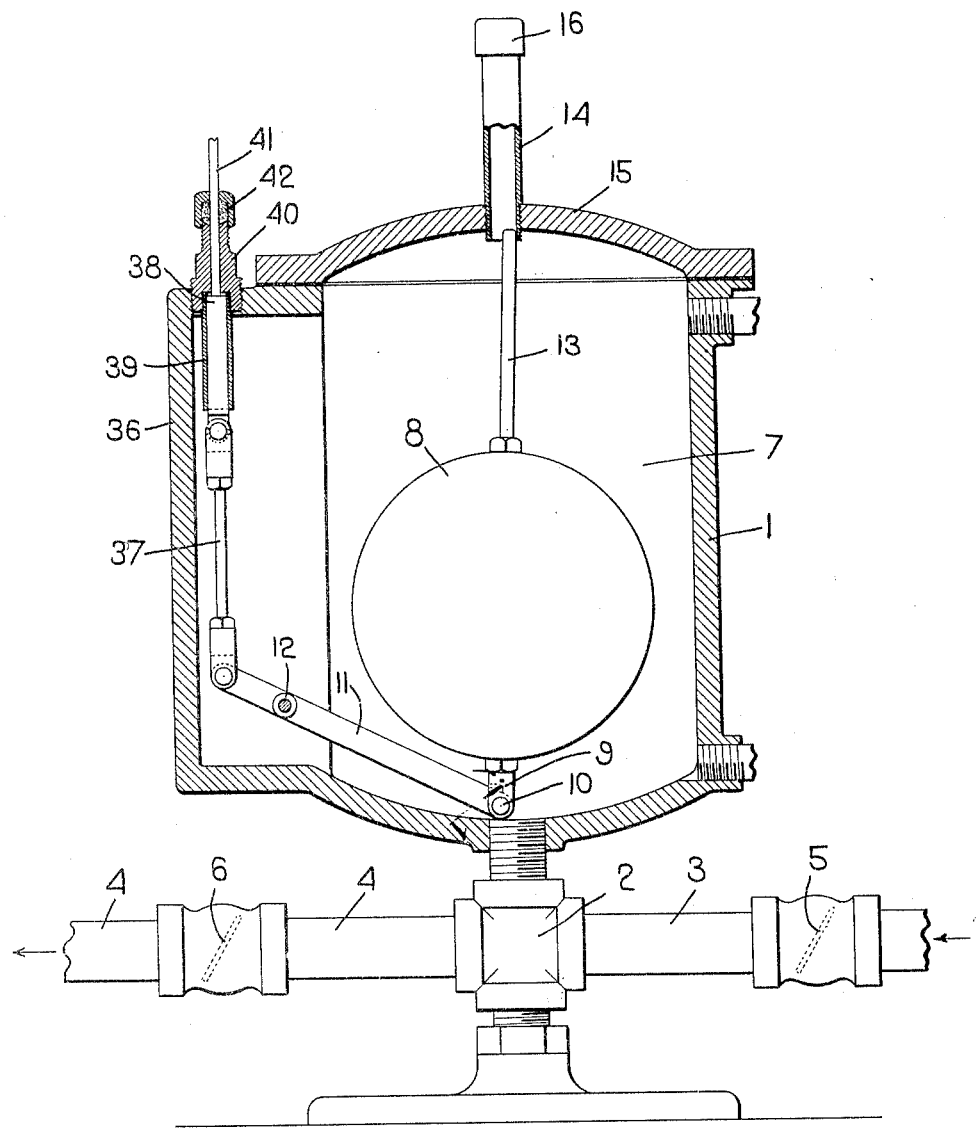

Feb. 9, 1932.   W. R. TEMPLETON   1,844,450
STEAM TRAP
Filed Dec. 17, 1929   4 Sheets-Sheet 4
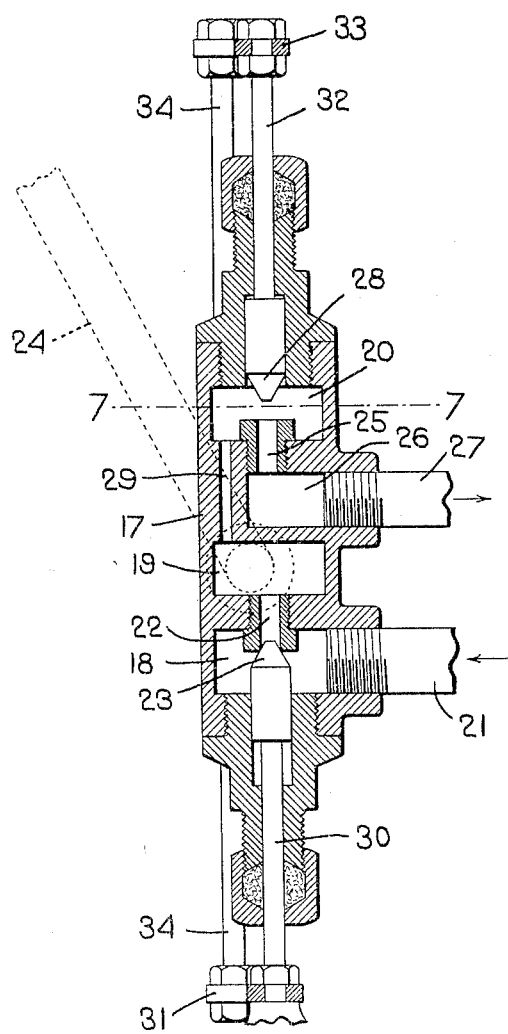
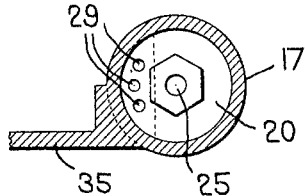
Inventor.
William R. Templeton
by Heard Smith & Tennant.
Attys.

Patented Feb. 9, 1932

1,844,450

UNITED STATES PATENT OFFICE

WILLIAM R. TEMPLETON, OF ROSLINDALE, MASSACHUSETTS

STEAM TRAP

Application filed December 17, 1929. Serial No. 414,660.

This invention relates to steam traps of the type which are used for returning to a boiler used for steam-heating purposes the water of condensation which drains from the radiators.

The features wherein the invention resides will be more fully hereinafter described and then pointed out in the appended claim.

In the drawings, Fig. 1 is a side view of a steam trap embodying my invention;

Fig. 5 is a sectional view through the float chamber on the line 5—5, Fig. 2;

Fig. 6 is a sectional view through the valve taken on the line 6—6, Fig. 2;

Fig. 7 is a section on the line 7—7, Fig. 6.

Figure 1:
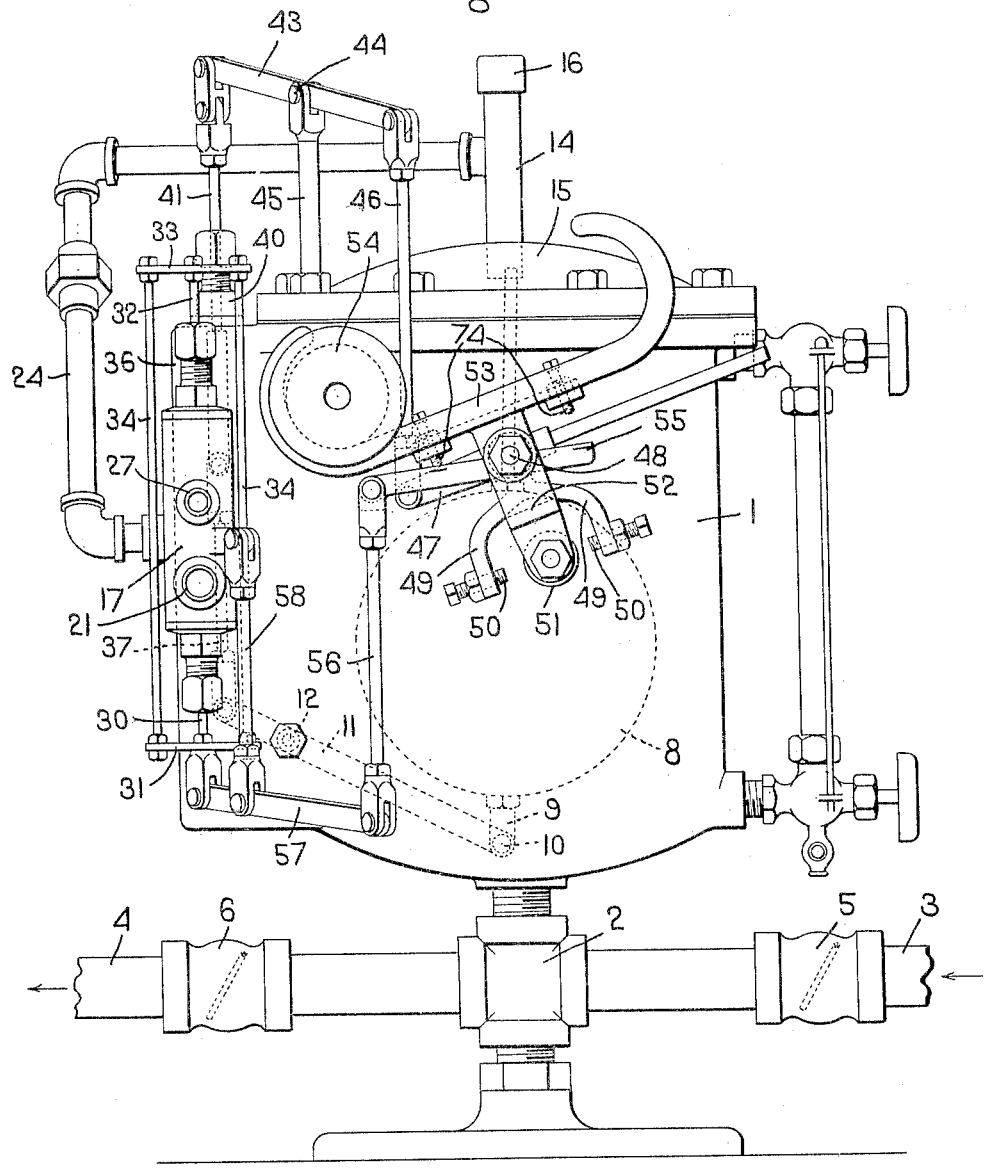
Figure 2:
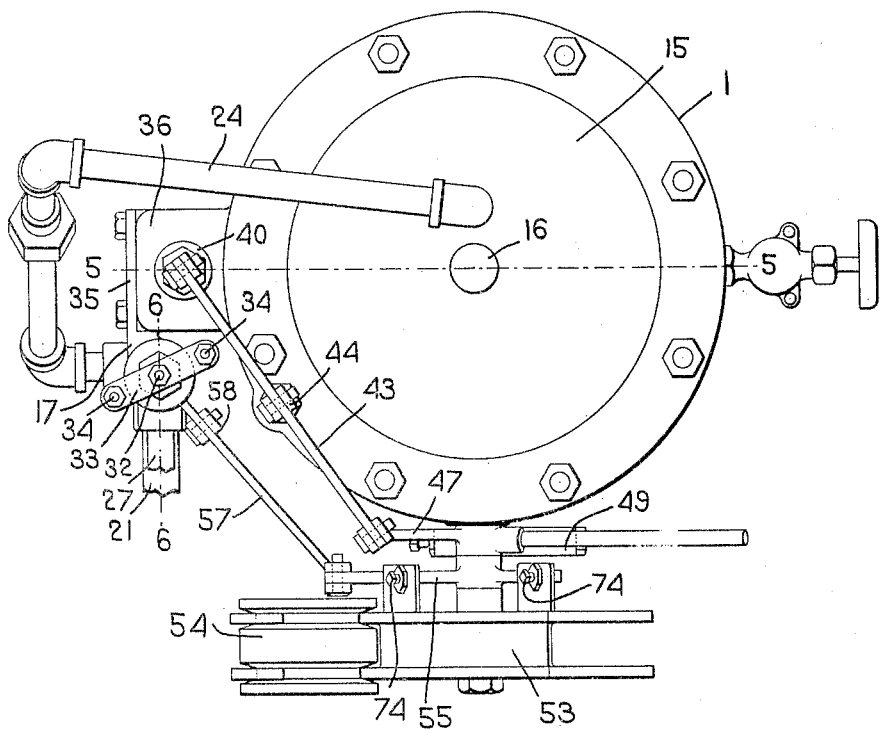
Fig. 2 is a top plan view.

The trap comprises a casing 1 which is connected by the T-connection 2 to both a return pipe 3 with which the radiators communicate and a discharge pipe 4 which leads to the boiler. The return pipe 3 has a check valve 5 therein which permits the return water to flow into the casing 1 but prevents any back flow and the pipe 4 has a check valve 6 therein which permits water to flow from the casing 1 into the steam boiler but prevents any return flow.

In traps of this type the check valve 6 in the discharge pipe 4 is normally held closed by the steam pressure thereagainst and as the water drains from the radiators it will flow through the return pipe 3 and T-fitting 2 into the chamber 7 of the casing 1, said chamber being open to the atmosphere. When a sufficient amount of water has accumulated in the chamber 7 the vent to the atmosphere is closed and steam from the steam boiler is admitted to the chamber thereby to build up therein a pressure equal to that of the steam boiler. As soon as this occurs the water will gravitate from the chamber 7 through the fitting 2 and pipe 4 into the boiler, the check valve 5 being held closed by the boiler pressure.

When the water has drained out of the chamber 7 then the steam pressure is shut off from said chamber and the vent opened thus restoring the parts to a condition where water from the return pipe 3 will drain into the chamber 7 again.

The delivery of the steam to the casing and the opening and closing of the vent is accomplished in the present invention through the medium of a valve device illustrated in Fig. 6, the operation of which is controlled by a float 8 in the chamber 7. This float 8 is shown as having a connecting bracket 9 secured thereto which is pivoted at 10 to the end of a float lever 11, the latter being pivotally mounted within the casing 7 as shown at 12. The float is guided in its rising and falling movements by a guiding rod or stem 13 which is rigid with the float and extends upwardly therefrom and which operates in a guiding tube 14 that is screwed to the cap 15 of the casing 1 and which opens into the chamber 7. This tube 14 is closed at its upper end by a cap 16. The interior of the tube is somewhat larger than the guiding stem 13 so as to allow the float to rise and fall freely without any binding, it being understood that the bracket 9 at the lower end of the float moves on an arc struck from 12 as a center.

The valve which controls the venting of the chamber 7 and the admission of steam thereto is illustrated in Fig. 6. It comprises a valve casing 17 formed with the steam chamber 18, the intermediate chamber 19, a vent valve chamber 20 and a vent chamber 26.

The steam chamber 18 communicates with a source of steam supply through a pipe 21 and the vent chamber 26 communicates with the atmosphere through a vent pipe 27. The steam chamber 18 communicates with the intermediate chamber 19 through a port 22 which is controlled by a steam valve 23, said valve being shown as closing the port in Fig. 6. The intermediate chamber 19 has a pipe connection 24 communicating therewith which leads to the top of the float chamber 7 so that when the valve 23 is unseated steam from the boiler may pass from the chamber 18 through the port 22 into the chamber 19 and thence through the pipe 24 into the float chamber 7.

The vent valve chamber 20 communicates with the vent chamber 26 through a port 25, which port is controlled by a vent valve 28 which is shown as opened in Fig. 6. The intermediate chamber 19 and vent valve chamber 20 are permanently connected through ports 29 which extend through a thickened portion of the wall of the valve casing 17.

The valves 23 and 28 are connected together so that they operate in unison but oppositely so that when the valve 23 is closed the valve 28 is open and vice versa. The valve 23 is provided with a valve stem 30 which is connected to a yoke 31 and the valve 28 is also provided with a valve stem 32 connected to another yoke 33. The two yokes 31 and 33 are rigidly connected by tie rods 34 which extend outside of the valve casing 17. The two valves 23 and 28 are thus tied together so that they move as a unit but because they are faced in opposite directions, one valve will always be closed when the other is open.

The valve casing 17 is formed with an edge flange 35 which is secured to and supported by the portion 36 of the casing 1.

The connected valve members 23, 28 are actuated by the float 8 as above stated and for this purpose I have illustrated herein a mechanism such as is more or less commonly used in steam traps for actuating the valves.

The float arm 11 is connected by a link 37 to a rod 38 which is slidably mounted in a sleeve 39 depending from a plug member 40. This rod 38 has a reduced portion 41 which extends up through the plug member, the latter being provided with the usual-stuffing box 42. This rod is pivotally connected at its upper end to a lever 43 which is centrally pivoted at 44 to a stand 45 secured to the casing 1. The other end of the lever is connected by a link 46 with a rocking member 47 pivotally mounted on a stud 48 extending from the casing 1. This rocking member 47 has integral with it the two arms 49, each carrying an adjusting screw 50 and situated between the screws 50 is a roll 51 carried by an arm 52 depending from a cradle 53 that is also pivoted on the stud 48. The cradle 53 carries a rolling weight 54 which is adapted to roll from one end to the other of the table as the latter is tipped. The tipping movement of the cradle serves to actuate the valves, the construction being such that as the float 8 gradually rises the cradle 53 will be gradually turned into a position so that the weight will roll to the other end thereof and when this occurs the valve will be quickly shifted.

The cradle is provided with two set screws 74 situated on opposite sides of the pivot and these set screws are adapted to engage the opposite ends of a rocking member 55 which is pivoted coaxially with the cradle. One end of the member 55 is connected by a link 56 to a lever 57 pivoted centrally to a supporting member 58 that is carried by the valve casing 17. The other end of the lever 57 is connected to the yoke 31.

With the parts in this position it will be understood that as the float 8 rises due to an accumulation of water in the casing 1 the lever 43 will be turned thereby raising the connection 46 and turning the rocking member 47 in a clockwise direction. As this member is turned the right hand stop screw 50 will be brought into engagement with the roll 51 and thereafter the cradle will be given a turning movement. When the cradle has been carried into a position just beyond the horizontal the weight 54 will ride down to the right hand end of the cradle thus giving it a quick tipping movement and bringing one of the adjusting screws 74 against the right hand end of the lever 55 thereby causing said lever to partake of the quick tipping movement. This will act through the connection 56 to rock the lever 57 thereby moving the valve 23 down to open the port 22 and causing the valve 28 to close the port 25. This lifting movement of the float will result from the accumulation of the water in the chamber 1 as it drains thereto through the return pipe 3 from the radiators.

As soon as the valves have been thus shifted steam will be admitted from the boiler through the pipe 21, chamber 18, port 22 and pipe 24 into the top of the float chamber 7 thereby equalizing the pressure between the float chamber and the boiler. This same movement closes the vent port 25. As soon as the steam pressure in the chamber 7 has become equalized with that in the boiler, then the water in the chamber 7 will gravitate into the boiler through the discharge pipe 4 and during this time the check valve 5 will prevent the water from passing back into the radiators.

As the chamber 7 empties itself and the float descends the cradle will be given a quick tilting movement back into the position shown in Fig. 1 just as the float reaches the lower limit of its movement thereby closing the steam port 22 and opening the vent port 25. The venting of the chamber 7 reduces the pressure therein to atmospheric pressure and the parts are then again in position for the water of condensation which is accumulating in the pipe 3 to flow into the chamber 7 again. When the chamber has been filled to a predetermined point the above operations will be repeated.

Figure 3:
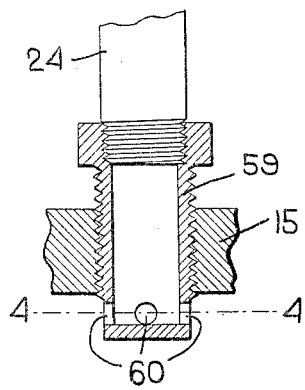
Fig. 3 is a fragmentary sectional view showing the manner in which the steam is delivered to the float chamber.
Figure 4:
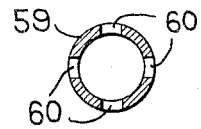
Fig. 4 is a section on the line 4—4, Fig. 3.

In admitting the steam to the upper end of the chamber 7 it is desirable that the steam should be spread out in a sheet formation rather than being delivered directly into the water. To accomplish this I propose to use a construction such as shown in Figs. 3 and 4. The pipe connection 24 is connected to a plug member 59 which is screwed into the top 15 of the casing 1, the lower end of said plug member projecting slightly into the chamber 7 and being provided with the lateral openings 60 through which the steam escapes.

The steam will thus be delivered in laterally-extending jets which will allow the chamber to be filled with steam under pressure without unduly agitating the water therein.

The device herein illustrated is an extremely efficient device for a relatively small trap and has special advantages when used with gas-fired boilers.

I claim.

A steam trap having a float chamber provided with an inlet connection and a discharge connection, a float in said chamber, a valve structure comprising a valve casing provided with transverse partitions dividing said casing into a series of axially-aligned chambers, the chamber at one end constituting a steam chamber, the chamber at the other end constituting a vent valve chamber and of the two central chambers the one adjacent the steam valve chamber constituting an intermediate chamber and the other a vent chamber, a connection from the steam chamber to the steam supply, a steam valve controlling communication between the intermediate chamber and the float chamber, the vent chamber communicating with the atmosphere, a vent valve operating in the vent valve chamber and controlling communication between the latter and the vent chamber, said valve casing having a by-pass connection around the vent chamber and providing communication between the intermediate chamber and the vent valve chamber, means connecting the steam valve and the vent valve so that they operate in unison but oppositely, and means rendered operative by the movement of the float to open the steam valve and close the vent valve when the float rises and to open the vent valve and close the steam valve when the float falls.

In testimony whereof, I have signed my name to this specification.

WILLIAM R. TEMPLETON.